(12) United States Patent
Tiede

(10) Patent No.: US 6,502,835 B1
(45) Date of Patent: Jan. 7, 2003

(54) COLLET HOLDER WITH ROTATION MECHANISM AND METHOD

(75) Inventor: Clair L. Tiede, Plover, WI (US)

(73) Assignee: Beere Tool Company, Inc., Racine, WI (US)

(*) Notice: Subject to any disclaimer, the term of this patent is extended or adjusted under 35 U.S.C. 154(b) by 198 days.

(21) Appl. No.: 09/709,602

(22) Filed: Nov. 13, 2000

(51) Int. Cl.[7] .......................... B23Q 16/10; B23B 31/20
(52) U.S. Cl. .................. 279/5; 74/813 L; 74/813 C; 279/4.02; 279/4.09; 279/50; 279/126; 409/221
(58) Field of Search ............................ 279/4.02, 4.09, 279/5, 50, 126; 409/198, 221–223; 74/813 L, 813 R, 813 C, 822, 823

(56) References Cited

U.S. PATENT DOCUMENTS

| | | | |
|---|---|---|---|
| 2,479,973 A | 8/1949 | Scott | 279/65 |
| 2,704,671 A * | 3/1955 | Abramoska et al. | 279/5 |
| 2,704,672 A * | 3/1955 | Wiltsie et al. | 279/5 |
| 3,087,736 A | 4/1963 | Lukas | 279/4 |
| 3,572,174 A * | 3/1971 | Lynn | 74/822 |
| 3,632,122 A * | 1/1972 | Sessody | 279/50 |
| 3,685,845 A * | 8/1972 | Fischer et al. | 279/5 |
| 3,805,504 A * | 4/1974 | Franzen | 57/261 |
| 4,103,589 A | 8/1978 | Francis | 90/56 R |
| 4,326,372 A * | 4/1982 | Inger | 57/88 |
| 4,576,530 A * | 3/1986 | Haas et al. | 409/221 |
| 4,678,381 A * | 7/1987 | Bailey | 409/221 |
| 5,249,815 A | 10/1993 | Beere | 279/4.04 |

FOREIGN PATENT DOCUMENTS

| | | | | |
|---|---|---|---|---|
| DE | 3235124 A1 * | 3/1984 | | 74/813 L |
| EP | 0531732 A1 * | 3/1993 | | 74/813 R |

* cited by examiner

Primary Examiner—Steven C. Bishop
(74) Attorney, Agent, or Firm—Arthur J. Hansmann

(57) ABSTRACT

A work piece holder with clamping and rotation mechanisms in a support. A holder or brake exists next to a collet and sleeve assembly to restrain the assembly from rotating. Hydraulic pumps and connections operate on the mechanisms for the clamping and rotating actions. An electronic controller is connected with the mechanisms and operates the system in a sequence for selective machining on the work pieces.

19 Claims, 5 Drawing Sheets

COLLET HOLDER WITH ROTATION MECHANISM AND METHOD

This invention relates to a collet holder with a rotation mechanism and method, and, more particularly, it relates to a collet holder having a plurality of collets supported in one unit and with each collet being rotatable about it own longitudinal axis. There is a mechanism and method for securing the collet in various selected rotatable positions.

BACKGROUND OF THE INVENTION

The prior art is aware of collet holders for rotatably supporting a plurality of collets. Those collets each receive and clamp a work piece and they can be rotated to various angular positions for presenting the work piece for various machining tasks.

The present invention improves upon the prior art by providing a collet holder wherein the collets are accurately rotated to selected positions and they are firmly held in the selected rotated position for the machining operation. That is, the rotation is precise and then a holding force is applied to the collet to assure that the work piece is retained in the desired work position for the forceful machining operation.

Further, this invention provides for electric and hydraulic powering for the collet function of clamping the work piece and the function of rotating the clamped work piece.

Still further, there is an electric controller that can be programmed to establish the rotated positions. Also, there is operation that is initially actuated to take up any backlash in the system, and that provides a zeroing function, and thus a starting position is established. If machining is to be done at that position, then it is carried out and the work piece can be rotated to a next position, if desired. Finally, the hydraulic force is released and the work piece is released from the collet, and additional work pieces can be inserted into the collets for additional and like machining, if desired.

To assure precision in achieving the rotated positions of the collets, the collets are rotated together in unison through an interconnected drive, and the collets are then secured in the selected rotated position by holding mechanism that is applied to the diametrically opposite sides of each collet to provide equalized force on those opposite sides of each collet.

DETAILED DESCRIPTION OF THE PREFERRED EMBODIMENT AND METHOD

Figure 1:
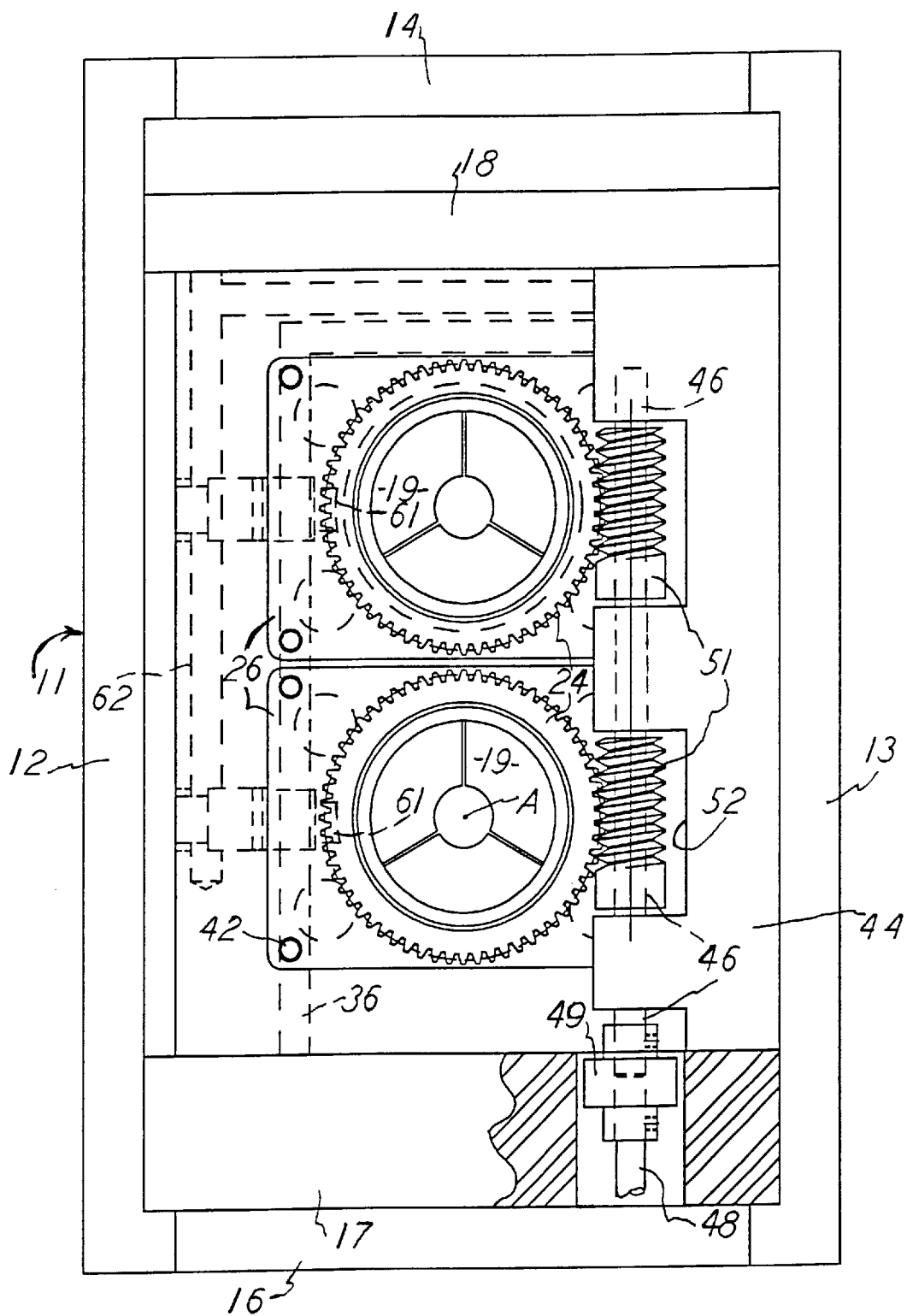
FIG. 1 a top plan view of a collet holder of this invention, with parts removed and broken away.

The holder shown in the drawings is herein described in detail, and, in that description, the method is also described. In the apparatus and method, there is an arrangement for presenting work pieces, such as pieces 10, in secured positions, and the work pieces 10 can be rotated about their upright longitudinal axes and then secured in the rotated positions by a holding action.

The drawings show a collet holder with two sections, one for each work piece 10. Of course, there could be a different number of holder sections within the scope of this invention. A base or support 11 includes side pieces 12 and 13 and mounting base pieces 14 and 16, and there are other base or support pieces such as cross pieces 17 and 18 extending between the side pieces 12 and 13. Therefor, in any suitable manner, a base or support is provided.

Figure 2:
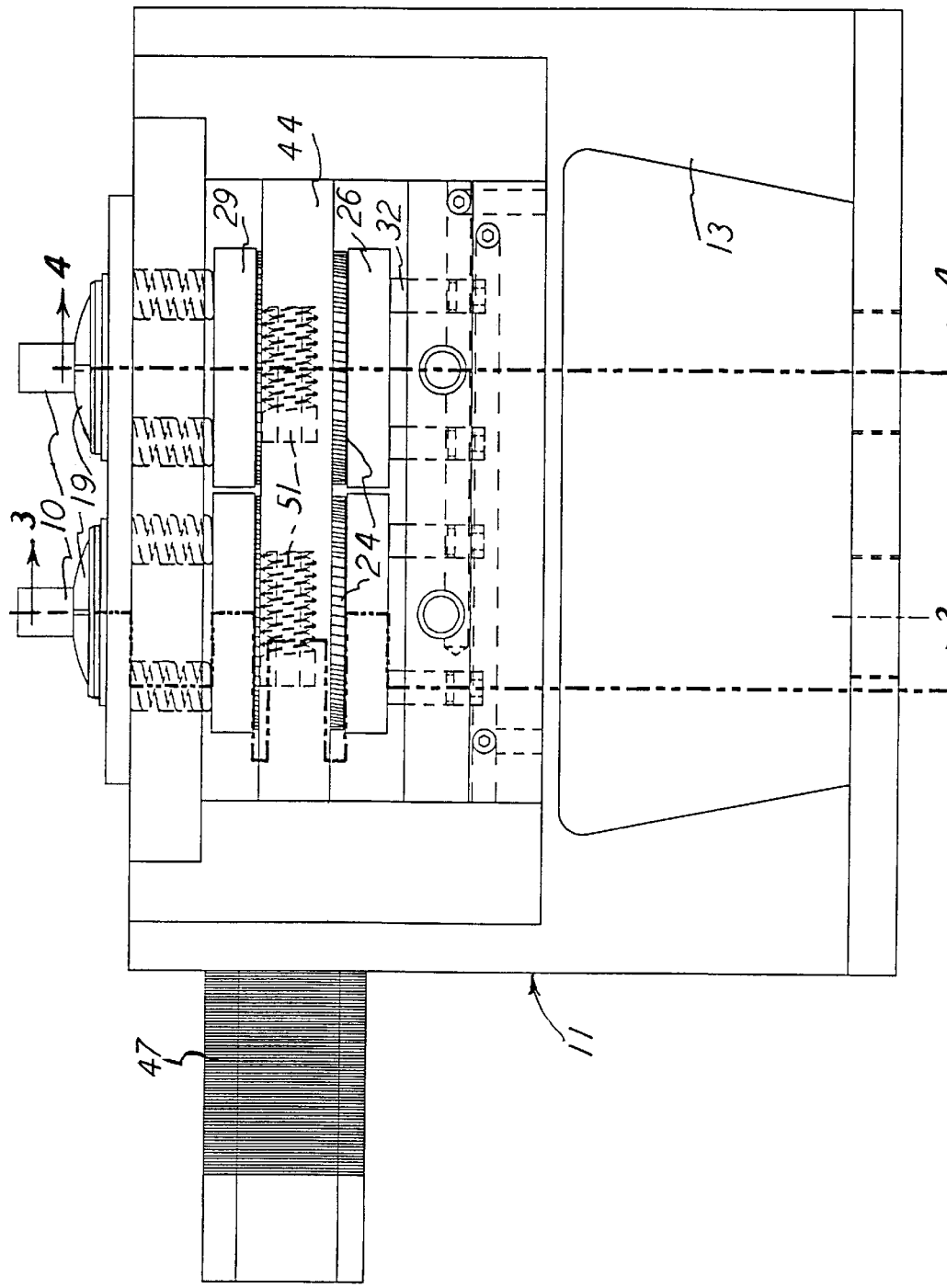
FIG. 2 is a right side elevational view of FIG. 1, with parts added thereto.

As seen in FIGS. 1 and 2, the two sections are identical to each other, and description of only one is therefore sufficient. In a well-known manner, the work piece 10 is clamped in a collet 19 which is held by a collet nut 21 against axial movement in the upright direction in FIG. 4. The collet 19 has the usual conical surface 22 for effecting the clamping action in response to applying an axial force on the collet. A unique sleeve 23 surrounds the collet 19 and extends coaxially therewith, all extending about the axis A. Upon effecting the clamping action, and that is by urging the sleeve 23 upwardly as viewed in the drawings, the collet 19 and sleeve 23 become a unit such that rotation of the sleeve 23 will likewise rotate the collet 19 and its work piece 10.

Figure 3:
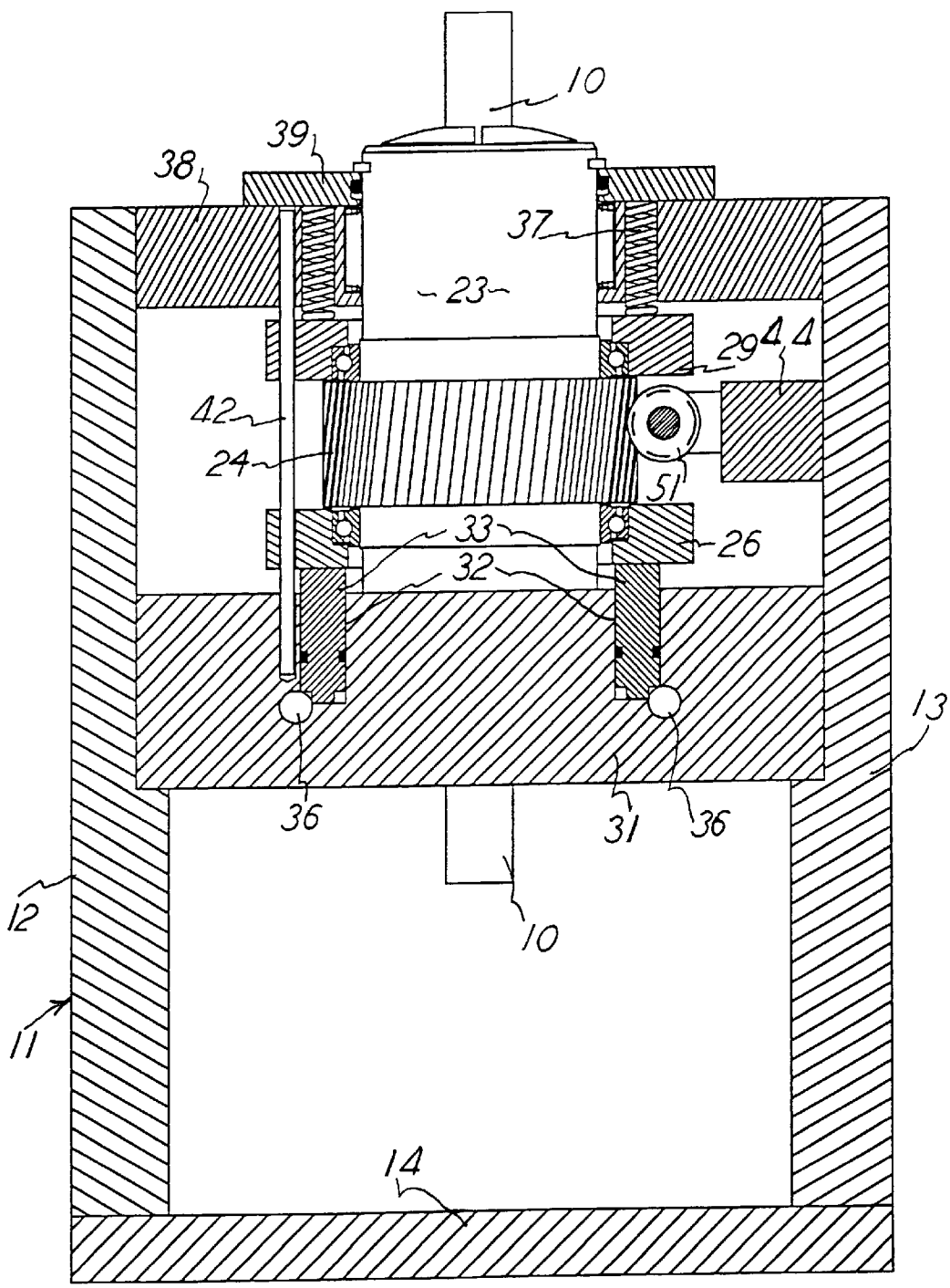
FIG. 3 is a sectional view taken on a plane along the line designated 3—3.
Figure 4:
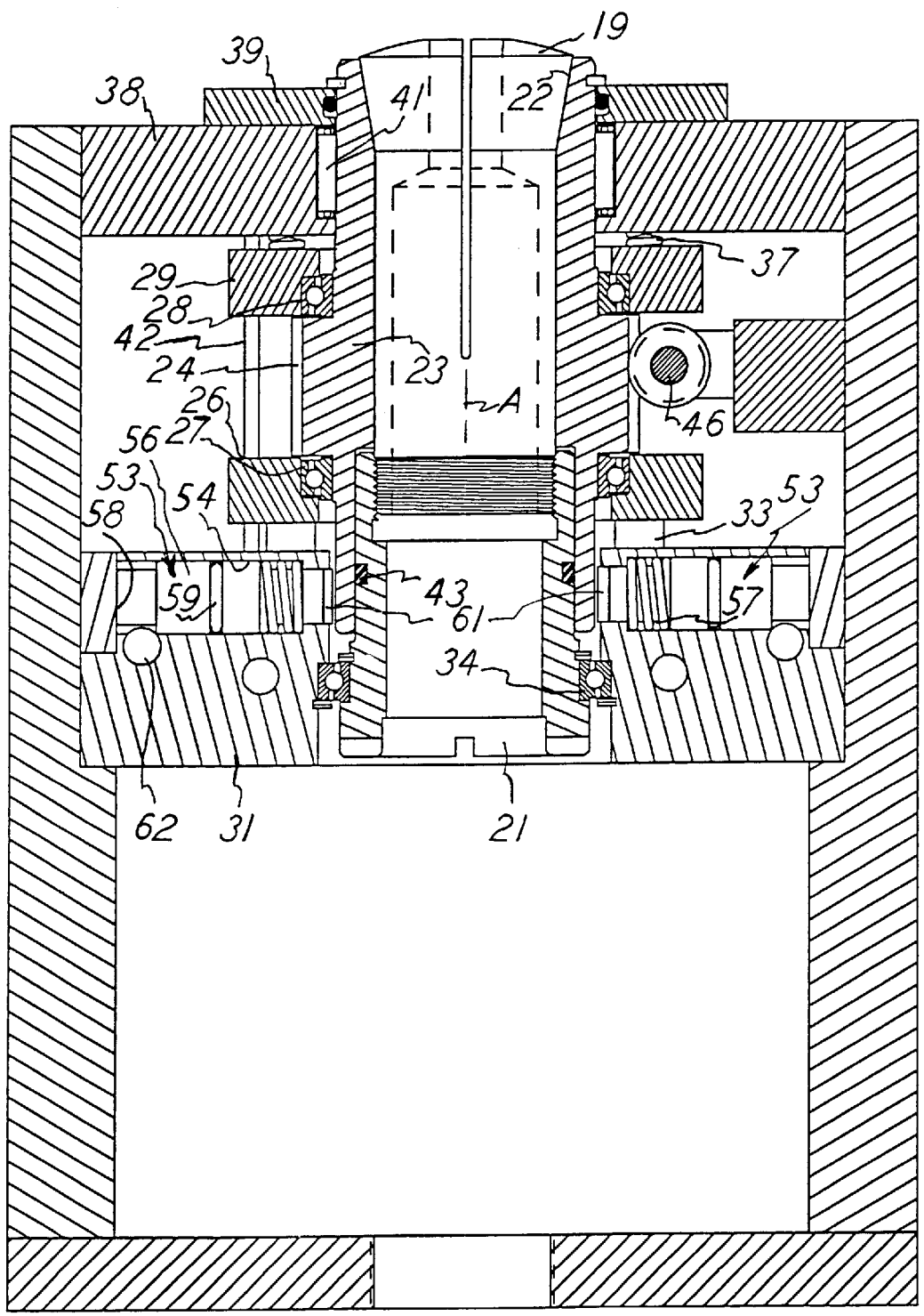
FIG. 4 is a sectional view taken on a plane along the line designated 4—4.

The sleeve 23 has a worm gear 24 integral thereon and extending endlessly therearound as a portion of the sleeve. FIGS. 3 and 4 show a compression plate 26 surrounding the sleeve 23 and supporting a thrust bearing 27 which is in contact with the sleeve through the gear 24. Another thrust bearing 28 is supported on a release plate 29 and is in contact with the top of the gear 24. Thus the sleeve 23 is axially positioned in accord with the positions of the bearings and plates mentioned.

The support includes a cross piece 31 which has two cylinders 32 slidably receiving two pistons 33 which are in contact with the compression plate 26. Also, two thrust bearings 34 are interposed between the collet nut 21 and the cross piece 31 to thereby axially restrain the nut 21 and thus the collet 19.

Hydraulic passageways 36 extend to the cylinders 31 and direct pressurized fluid onto the pistons 33 for forcing upwardly on the plate 26 and the collet 19 to thereby effect the clamping action of the collet 19 on the work piece 10. Hydraulic pressure is suitably applied in the passageways 36 from an unshown external source, and suitable hydraulics fitting would be attached to the support for conducting the pressurized oil or like.

To release the axial force on the collet 19 and thereby release the work piece 10, compression springs 37 are applied to the release plate 29, through the bearing 28, to urge downwardly on the sleeve 23, and to move the plate 29 downwardly after the hydraulic pressure is relieved. The springs 37 are disposed in a top plate 38 which is a part of the support. Also, there is a cover plate 39 at the upper end of the holder, and the plate 39 limits upward movement of the springs 37, and all are suitably assembled together.

The top plate 38 supports a needle roller bearing 41 which rotatably supports the sleeve 23, along with the other shown bearing support. Throughout the holder, the bearings can be of any type suitable for the respective thrust and rotation requirements, and they may be different from those shown and from the positions shown herein. The thrust force and the rotation freedom are thusly accommodated by any suitable bearings. Anti-rotation pins 42 extend between the cross piece 31 and the top plate 38 and through the plates 26 and 29, and they stabilize the pressure plates 26 and 29 while allowing them to move.

A friction ring 43 extends between the nut 21 and the sleeve 23 to avoid rotation therebetween after nut adjustment on the collet 19 for initial clamping of the work piece and for countering the action of the hereinafter described worm and worm gear when subjected to forces creating axial movement of the sleeve in the tightening of the collet.

The base 11, which can be affixed to any but unshown support, has an elongated block 44 attached thereto and extending parallel to the line between the collets 19 and substantially tangential to the worm gears 24. A worm-supporting shaft 46 is rotatably supported in the block 44, and an electric motor 47 is supported on the base and is in rotational drive relation with the shaft 46, such as through the motor shaft 48 and a zero backlash coupling 49. In that arrangement, actuation of the motor 47 and rotation of the shaft 46 is free of lost motion between the motor 47 and the shaft 46, so there is precision in the drive therebetween.

Two worms 51 are mounted on the shaft 46 in the locations of two respective openings 52 in the block 44, as seen in FIG. 1. The worms 51 are integral with the shaft 46 to rotate therewith and to be axially fixed along the length of the shaft 46 to thus remain in their axially shown positions upon rotation of the shaft 46. The worms 51 are in gear-meshing relationship with the gears 24 to thereby rotate the gears 24 upon rotation of the shaft 46, in either direction of rotation. In that manner, the work pieces 10 are rotated in the precision, and to the positions, desired.

To secure the work pieces 10 in their selected rotated positions, a holding assembly 53 is positioned on diametrically opposite sides of the respective sleeves 23, such as shown in FIG. 4. With the two holding assemblies arranged and positioned as shown, there is firm and balanced holding action applied to each sleeve 23. The holding forces are applied in direct opposition to each other through the assemblies 53, so there is no side loading and no torque on the sleeve 23 which therefore maintains its selected rotated position.

The cross piece 31 has two cylindrical openings 54 therein, and each opening 54 respectively receives one of the holding assemblies 53. The assemblies 53 include a piston 56 and a compression return spring 57 acting on the piston to urge it away from the sleeve 23 and to a released position. The holding piston 56 abuts a wall 58 on the piece 31 to limit retraction of the piston in its release action. Thus, there is only minimal movement of the piston 56 required to effect holding engagement with the sleeve 23. An O-ring 59 surrounds each piston 56 to prevent leakage of hydraulic fluid beyond the confines of the hydraulic system.

Adjacent the holding assemblies 53, the sleeves 23 are circumferential in shape, and the holding assemblies have brake or holding friction-material pads 61 affixed to the ends of the pistons 56, and the pads 61 accommodate the circular sleeve shape by also being arcuate, as shown. Again, with that feature, the holding assemblies firmly secure the sleeves and thus the work pieces in the selected rotated positions.

Hydraulic passageways 62 extend through the support to communicate with the cylindrical openings 54, and pressurized fluid can be applied to the pistons 56, as desired for the holding action. All four cylindrical openings 54 are exposed to pressurized hydraulic fluid equally and simultaneously with the flow system shown.

Figure 5:
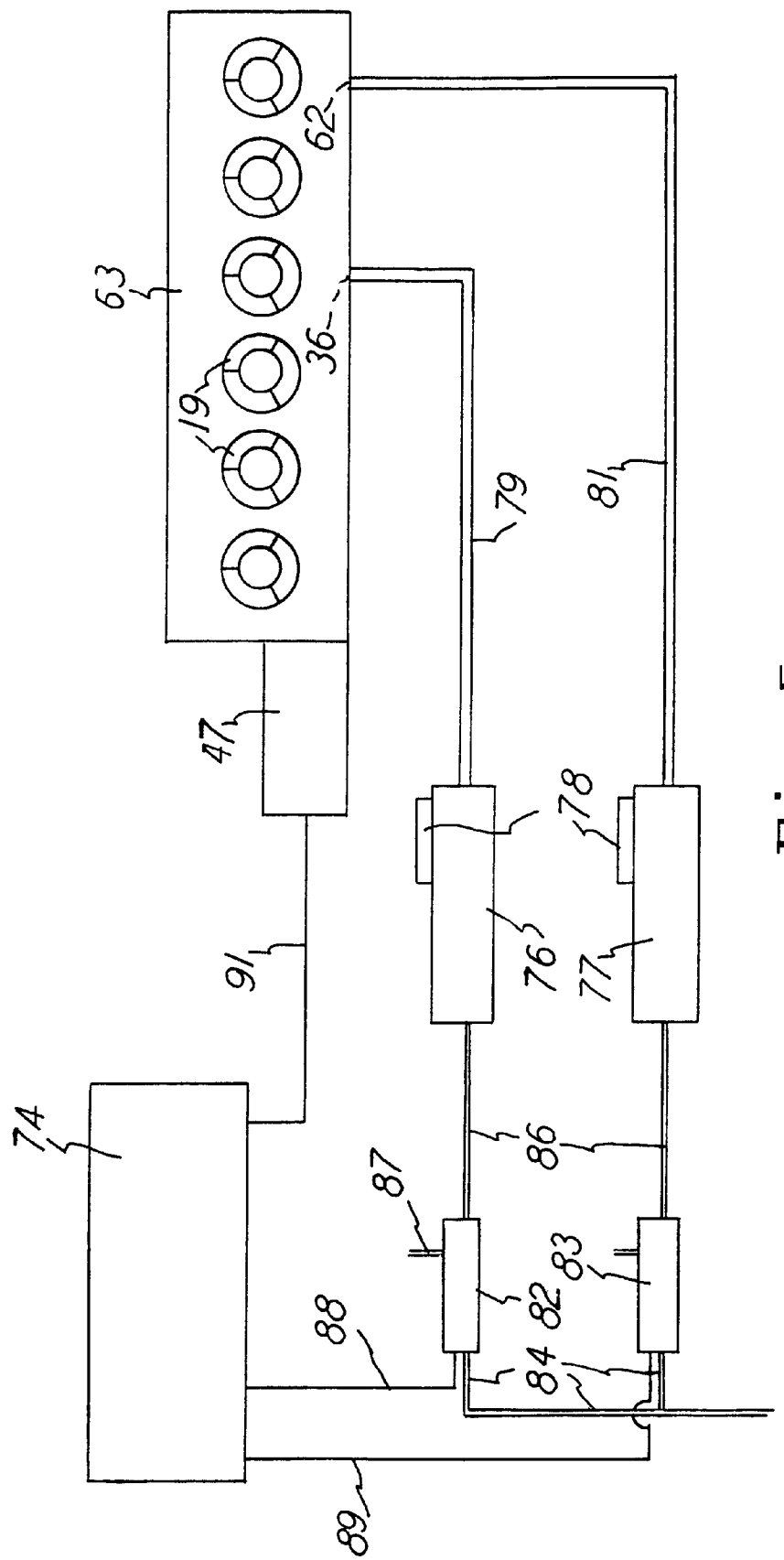
FIG. 5 is a diagramatic view of this invention system.

FIG. 5 shows the system with a collet or holder support 63, and it now shows six, instead of only two, collets 19. Just as with the previous description, the electric motor 47 is connected to the support 63 and is connected to rotate the collets 19. An electronic controller 74 is also shown electrically connected in the system, and it is specifically constructed and programmed for the functions described herein.

The controller may be one supplied by the YUASA company, 10715 Springdale Ave, Santa Fe Springs, Calif., as model UNDC-100, 500-602535-106.

Two hydraulic pumps 76 and 77, with respective sumps 78, are hydraulically connected with the support 63 through respective hydraulic lines 79 and 81 and connect with the passageways 36 and 62. Different hydraulic pressures, as desired, can be applied to the respective passageways 36 and 62 because of the separate pumps 76 and 77 and their hoses 79 and 81 and the connections shown. Therefore, selectable and different hydraulic pressures can be applied to the clamp member 33 and the securing or brake member 53.

Suitable means can be employed for driving the pumps 76 and 77, and air valves 82 and 83 are shown. A pressured air supply through air lines 84 connected to the valves 82 and 83 can actuate the valves 82 and 83, and air lines 86 can connect to the pumps 76 and 77 for powering the pumps. Air valves 82 and 83 have air vents 87.

Electric lines 88 and 89 are connected between the controller 74 and the two air valves 82 and 83, and an electric line 91 connects between the controller 74 and the motor 47 for controlling the motor 47. Thus the electronic programming of the controller 74 creates the desired sequencing of the system.

One such sequence can be that after work pieces 10 are individually placed into the collets 19, the collets are actuated to clamp onto the work pieces by the actuation of the pump 76 which pressurizes passageway 36. The controller 74 will start the motor 47 to perform a "zeroing" function that takes up the gearing backlash and other inaccuracies in the drive system. Then the collets, and including their sleeves 23, can be secured in their rotated position by the holder or brake 53 which has been actuated by the pump 77 which is connected with the passageway 62, and that pump actuation can be by virtue of the controller 74 activating the air valve 83. There may be machining of the plurality of work pieces at that condition. Then the holder or brake 53 can be released by the controller 74, through the valve 83 actuating and thereby releasing hydraulic pressure in the pump 76 and allowing flow to go into the sump 78 under the influence of the return action created by the holder springs 57 forcing against the hydraulic pressure in that location.

Next, the collets 19 may be rotated or indexed to a second rotated position about their respective axes and by rotation of the motor 47 controlled through the controller 74. The holder may then again be applied to the collet through the action of the pump 77 to secure the selected rotated position. That programmed sequence can be repeated until the work pieces are machined in the various plurality of locations thereon, as desired.

Throughout this description, the method of effecting rotation and secure holding of the work piece is disclosed.

What is claimed is:

1. A work piece holder with rotation mechanism comprising:

a support, a releasable work piece clamp in said support and being actuatable to both clamp and rotate said work piece, a first mechanism and a second mechanism separately operatively associated with said clamp and being arranged to respectively effectuate clamping and rotation of said clamp, a third mechanism operatively associated with said clamp to selectively engage said clamp to thereby releasably secure said clamp against rotation, said first and said third mechanisms include members movable in a respective first direction relative to said clamp and operable on said clamp for respectively clamping and securing said work piece, a hydraulic pressure source fluid-flow connected with said members and having a first pressure level for selectively acting on said members and thereby move said members in said first direction, a spring operative on said members for urging said members in a direction opposite from said first direction to thereby move said members to release said clamp from clamping and securing upon drop in said hydraulic pressure to a second pressure level less than that of said first pressure level, and an electronic controller operatively associated with all said mechanisms to sequentially operate said mechanisms to thereby sequentially clamp said work piece, rotate said work piece, and secure said work piece against rotation, and with said controller being operatively associated with said hydraulic pressure source to thereby provide for said first and said second pressure levels.

2. The work piece holder with rotation mechanism as claimed in claim 1, wherein:

said second mechanism includes a worm and worm gear for the rotation of said clamp, and said third mechanism includes a piston movable toward and away from said clamp for the securing of said clamp against rotation.

3. A work piece holder with rotation mechanism comprising:

a base, a sleeve supported on said base and having a longitudinal axis and being rotatable about said axis, a collet in said sleeve and forming an assembly therewith and being arranged to clamp a work piece and being rotatable along with said sleeve and about said axis and thereby rotate said work piece, a gear rotatably supported on said base and being operatively associated with said sleeve for rotating said assembly about said axis, a holding device supported on said base and being operatively associated with said sleeve for selectively securing said sleeve against rotation about said axis, an electronic controller, an electric motor drivingly connected with said gear and arranged to rotate said gear, a pressurized hydraulic system having two separate flow branches in respective operative relationship with said assembly and said holding device and being arranged to respectively apply on said assembly a clamping force and a force to secure said assembly against rotation, and said electric motor and said hydraulic system being operatively associated with said controller to have said motor and said system sequentially applied by said controller in their respective functions with said gear and said assembly.

4. The work piece holder with rotation mechanism as claimed in claims 3, including:

said gear being a worm gear on said sleeve and having gear teeth centered on said axis and disposed to surround and rotate said sleeve, a worm rotatably supported on said base and having teeth in mesh with said worm gear teeth, and said holding device being movable into contact with said assembly in a direction radially toward said axis for releasably securing said assembly against rotation about said axis.

5. The work piece holder with rotation mechanism as claimed in claim 4, including:

a spring operative on said holding device for yieldingly urging said holding device in a direction opposite to said direction radially toward said axis.

6. The work piece holder with rotation mechanism as claimed in claim 4, including:

a lost motion avoidance connection between said worm and said electric motor.

7. The work piece holder with rotation mechanism as claimed in claim 3, wherein:

said assembly has diametrically opposite sides relative to said axis, and said holding device is hydraulic and is disposed to contact said assembly only on diametrically opposite sides of said assembly and is movable relative to said axis at both said opposite sides for applying egial force on said opposite sides.

8. The work piece holder with rotation mechanism as claimed in claim 7, including:

said sleeve is cylindrical in its external shape adjacent said holding device and has diametrically opposite sides, and said holding device has friction-inducing material thereon faced toward said sleeve and is movable into contact only with said sides of said sleeve.

9. A work piece holder with rotation mechanism comprising:

a base, a sleeve supported on said base and having a longitudinal axis and being rotatable about said axis and movable along said axis and having two diametrically opposite sides, a collet in said sleeve and forming an assembly with said sleeve and being arranged to clamp a work piece and being rotatable along with said sleeve and about said axis an d thereby rotate said work piece, a mechanical holding device supported on said base and being operatively associated with said collet for always holding said collet against movement along said axis, a hydraulic holding device supported on said base and being operatively associated with said sleeve for contacting said sleeve only on said two diametrically opposite sides of said sleeve and only with equal force on said opposite sides for releasably securing said sleeve against rotation about said axis, and a rotation device rotatably supported on said base and being operatively associated with said sleeve for rotating said assembly about said axis upon release of said second holding device.

10. The work piece holder with rotation mechanism as claimed in claim 9, wherein:

said mechanical holding device is a threaded connection, and a friction creating member interposed between said mechanical holding device and said collet for resisting threading rotation action between said mechanical device and said collet.

11. A work piece holder with rotation mechanism comprising:
   a support,
   a releasable work piece clamp in said support and being both axially movable and rotatable therein and thereby being separately actuatable to both clamp and rotate the work piece,
   said clamp includes a work piece holding collet always axially fixed on said support and having a longitudinal axis about which said collet rotates and said collet is arranged to clamp the work piece upon axial force relative to said collet,
   a first mechanism and a second mechanism separately operatively associated in driving relationship with said clamp and being arranged to respectively effectuate clamping and rotation of said clamp and with said second mechanism for rotation being self-adjustable to always remain in driving relationship with said clamp to accommodate effectuating the rotation after axial movement,
   a third mechanism operatively associated with said clamp to discretionarily engage said clamp to thereby secure said clamp against rotation, and
   an electronic controller operatively associated with all said mechanisms to sequentially operate said mechanisms to thereby sequentially clamp the work piece, rotate the work piece, and secure the work piece against rotation.

12. The work piece holder with rotation mechanism as claimed in claim 11, wherein:
   said first and said third mechanisms both include hydraulic systems with separate hydraulic lines to effectuate their respective clamping and anti-rotation holding functions, and
   said collet includes two diametrically opposite sides and said third mechanism includes two hydraulic pistons disposed on said diametrically sides of said collet and with both said pistons being connected with only one of said lines and being of equal force-applying construction through each of said pistons to produce equal and radially inwardly directed anti-rotation forces relative to said collet axis and on said diametrically opposite sides.

13. The work piece holder with rotation mechanism as claimed in claim 11, wherein:
   said second mechanism includes an electric motor in rotational drive relationship with said clamp, and
   a lost motion connector operatively connected with and between said electric motor and said clamp to selectively eliminate relative movement therebetween in the drive relationship from said motor to said second mechanism and thereby avoid backlash in the drive relationship.

14. The work piece holder with rotation mechanism as claimed in claim 11, wherein:
   said second mechanism includes a worm and worm gear in mesh with each other, and with said worm gear being a ring on said clamp in annular shape and centered on said axis and having an axial length with teeth extending axially therealong and in constant mesh with said worm throughout a range of axial movement of said clamp.

15. A method of presenting a work piece for rotational selective positioning, comprising the steps of:
   arranging a clamp for releasably clamping a work piece in a position to extend along an axis,
   rotating the work piece about said axis to a selected rotated position, and
   presenting a single hydraulic line adjacent said axis for radially inwardly applying only two separate and equal hydraulic forces from said line and onto the work piece and with the two forces being only diametrically opposite radial forces relative to said axis for securing the work piece against rotation about said axis.

16. The method of presenting a work piece for rotational selective positioning, as claimed in claim 15, including the steps of:
   providing a collet for securing the work piece in said collet and restraining said collet with the work piece against movement along said axis, and
   arranging for applying hydraulic pressures relative to the work piece for the clamping and securing.

17. The method of presenting a work piece for rotational selective positioning, as claimed in claim 16, wherein:
   the step of rotating the work piece is effected by drivingly connecting an electric motor with said collet and operating said motor.

18. The method of presenting a work piece for rotational selective positioning, as claimed in claim 17, including the steps of:
   connecting an electrically powered controller arranged to sequentially control said clamping and said rotation and said securing of the work piece all in a sequence of operations of separate and sequential functions, and
   arranging said controller for operation to effect said clamping and said rotation and said securing in the sequence of the operations.

19. A method of presenting a plurality of work pieces for rotational selective positioning, comprising the steps of:
   supporting a plurality of collets in respective positions to extend along respective axes and always holding said collets against movement along said respective axes,
   placing a work piece in each of said collets,
   axially movably and rotatably supporting a plurality of clamps respectively engaged with each of said collets and with each of said clamps having two diametrically opposite sides,
   axially moving said clamps relative to said collets for clamping the work pieces in said collets and presenting the work pieces in respective positions relative to said axes in a first selected rotated position,
   applying hydraulic pressure from a single hydraulic line to only said two diametrically opposite sides of said clamps and radially thereon for applying equal force on said sides and for holding the work pieces against rotation in said first selected rotated position,
   releasing the hydraulic pressure holding the work pieces against rotation,
   rotating the work pieces about said axes to a second selected rotated position, and
   repeating the step of applying hydraulic pressure from the single hydraulic line to the diametrically opposite sides of said clamps and releasably holding the work pieces against rotation in said second selected rotated positions.

* * * * *